United States Patent [19]

Trappo

[11] 4,144,725

[45] Mar. 20, 1979

[54] CENTRIFUGAL REGULATOR

[76] Inventor: Lucien Trappo, Rue du 11 novembre, 38640 Claix, France

[21] Appl. No.: 814,089

[22] Filed: Jul. 8, 1977

[30] Foreign Application Priority Data

Jul. 9, 1976 [FR] France ............................... 76 21041

[51] Int. Cl.$^{2}$ .......................... F16D 5/00; G01P 3/26; F16D 23/10

[52] U.S. Cl. ............................................ 64/25; 64/3; 64/4; 73/521; 192/105 A

[58] Field of Search ............ 192/105 A; 73/521, 611; 74/675; 64/3, 4, 25, 24; 123/90.15, 146.5 A, 146.5 C, 117 R

[56] References Cited

U.S. PATENT DOCUMENTS

| | | | |
|---|---|---|---|
| 771,771 | 10/1904 | Dysterad | 192/105 A |
| 1,195,250 | 8/1916 | Milbroth | 64/24 X |
| 1,340,610 | 5/1920 | Hills | 64/24 |
| 2,400,586 | 5/1946 | Zimmermann | 192/105 A |
| 2,452,008 | 10/1948 | Wickwire et al. | 192/105 A |
| 2,555,772 | 6/1951 | Wickwire | 192/105 A |
| 2,950,610 | 8/1960 | Stier | 64/25 |
| 3,137,236 | 6/1964 | Aschauer | 64/25 X |
| 3,500,976 | 3/1970 | Halley | 64/24 X |
| 3,545,580 | 12/1970 | Baer | 64/24 X |

FOREIGN PATENT DOCUMENTS

| | | | |
|---|---|---|---|
| 1209248 | 2/1960 | France | 192/105 A |
| 1302728 | 7/1962 | France | 64/24 |
| 475655 | 11/1952 | Italy | 64/25 |
| 480409 | 2/1938 | United Kingdom | 64/25 |
| 775214 | 5/1957 | United Kingdom | 64/25 |
| 1001742 | 8/1965 | United Kingdom | 73/521 |
| 1179932 | 2/1970 | United Kingdom | 64/24 |
| 1325863 | 8/1973 | United Kingdom | 64/25 |

*Primary Examiner*—Leslie Braun

*Attorney, Agent, or Firm*—Robert E. Burns; Emmanuel J. Lobato; Bruce L. Adams

[57] ABSTRACT

A centrifugal regulator comprises a casing containing mercury able to be set in motion by a drive shaft and a coupling means pivotally mounted on a hub. Two chambers of lower density than the mercury are pivoted to two spindles which in turn are pivoted to the casing. Support means are provided for supporting the chambers against two arms of the hub and which comprise two rigid knives each having a double edge. Each of these knives bears, on one edge, against a first bearing supported by one of the chambers and, on the other edge, against a second bearing supported by one of the arms. Spring means for biasing the chambers against the casing and sealing means between the hub and the casing are also provided.

9 Claims, 5 Drawing Figures

CENTRIFUGAL REGULATOR

The invention relates to a centrifugal regulator.

A known regulator comprises: a casing containing mercury driven by a shaft by way of coupling means, pivotally mounted on a hub integral with a shaft, two spindles supported by the casing; two chambers pivoted on the spindles, of lower density than the mercury, means for supporting the chambers against two arms of the hub; spring means biasing the chambers against the casing, sealing means between the hub and the casing.

A regulator of this type has several drawbacks: friction causing hysteresis such that for a certain speed, the point of equilibrium depends on the direction of variation of the speed; conventional gaskets (annular gaskets, gaskets comprising lips) are inadequate for mercury; conventional coupling means are bulky, inefficient if the spindles of the motor and hub are not aligned, are always under partial tensile stress and partial compression and do not facilitate adjustment of the relative angular position of the motor with respect to the casing.

The purpose of the invention is to obviate these drawbacks by proposing a regulator in which the support means are two rigid knives having a double edge; the sealing means are two membranes each in the shape of a closed circular ring, of M-shaped cross section; the coupling means are connected directly to the spindles of the chambers and indirectly to the drive shaft by mechanical means for adjusting the angular position of this shaft with respect to the casing.

The invention will be understood with reference to the description of one embodiment and the accompanying drawings in which.

Figure 1:
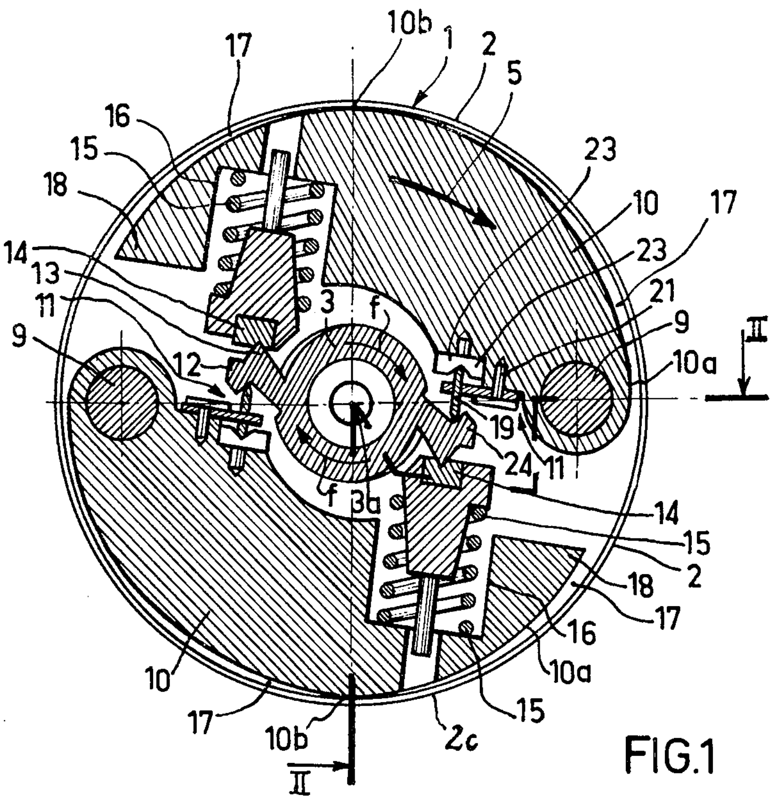
FIG. 1 is a cross sectional view of a regulator according to the invention.
Figure 2:
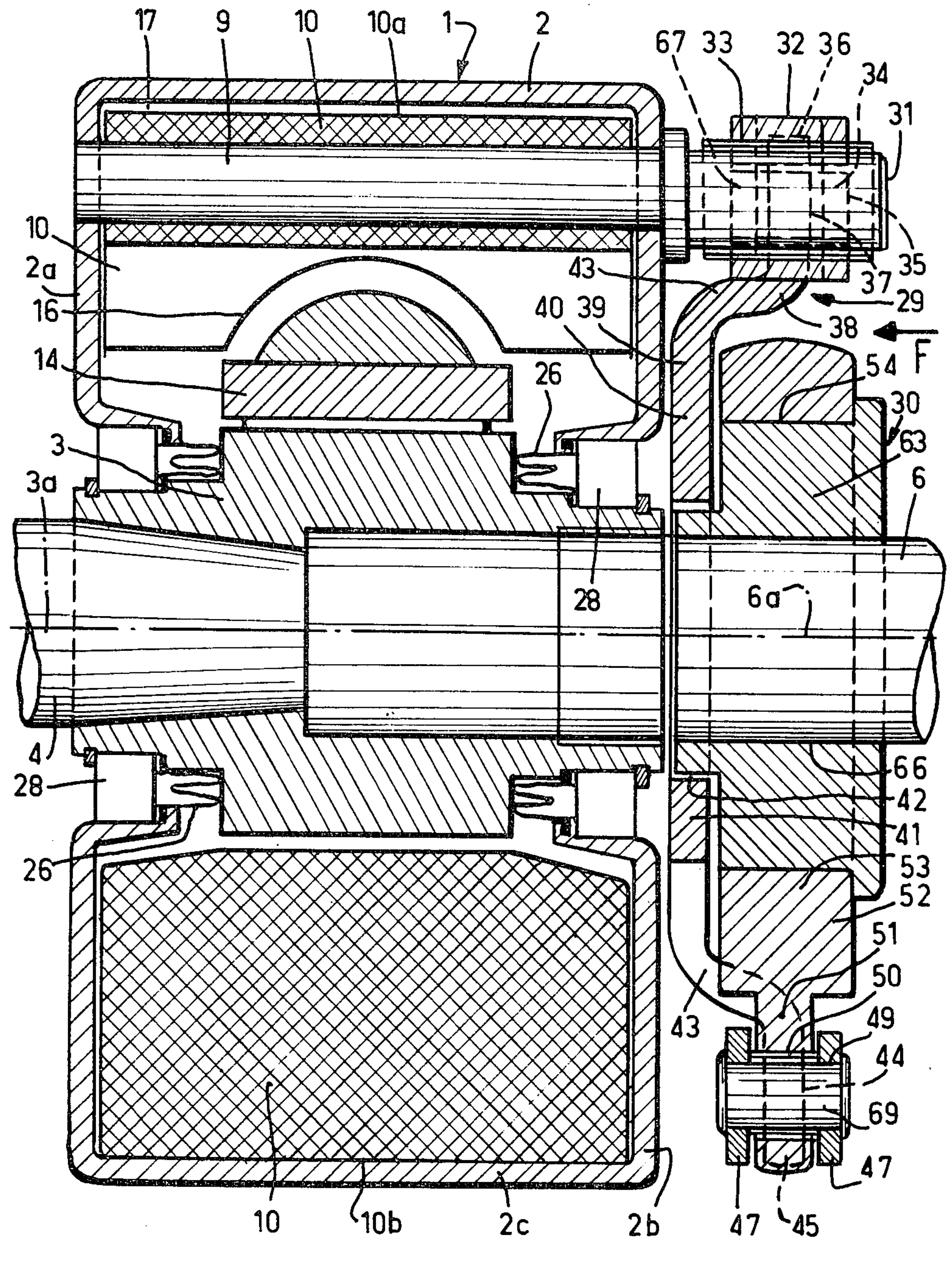
FIG. 2 is an enlarged sectional view on line II—II of FIG. 1.
Figure 3:
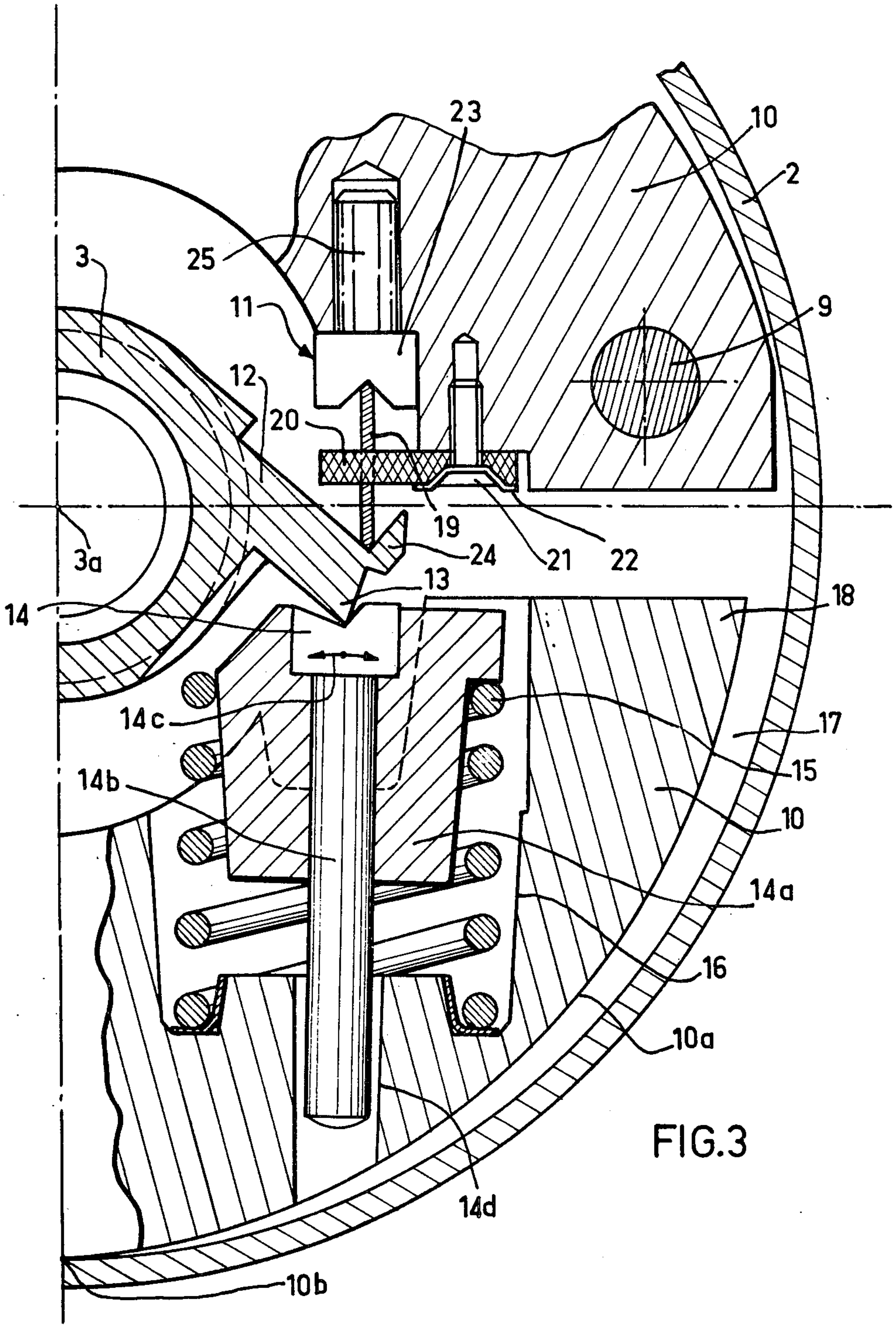
FIG. 3 is a partial cutaway view, to an enlarged scale, according to FIG. 1.
Figure 4:
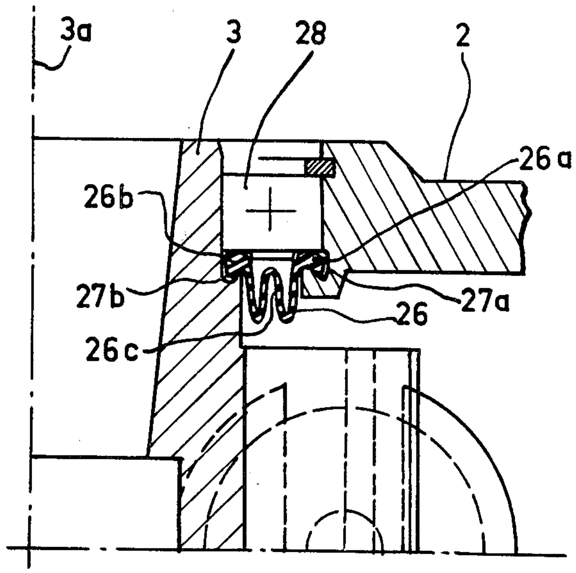
FIG. 4 is a partial view, to an enlarged scale, according to FIG. 2, of the sealing means.
Figure 5:
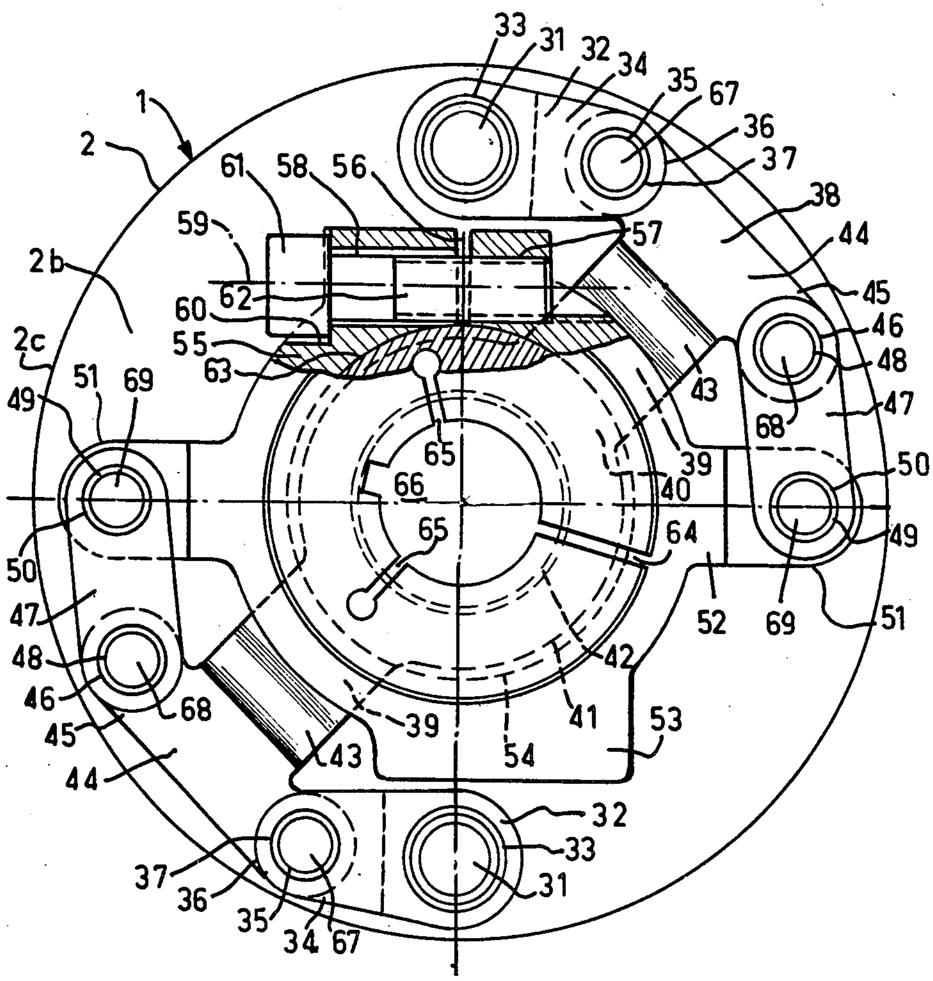
FIG. 5 is a view in the direction of arrow F of FIG. 2 of the coupling means.

The centrifugal regulator 1 comprises a casing 2, having two terminal sides 2*a*, 2*b* in the shape of a ring and an intermediate cylindrical wall 2*c*, mounted to pivot on a hub 3 on the axis 3*a* which is an axis of symmetry of the casing 2 and its contents, keyed to a shaft 4 driving an injection pump in particular; a drive shaft 6 on the axis 6*a* driving the casing 2 about the hub 3 in the direction of arrow 5 by coupling means 29; two spindles 9 parallel to the axis 3*a*, fixed to the sides 2*a*, 2*b*, situated in the vicinity of the wall 2*c*, extended outside the casing 2 from the side 2*b* by journals 31; two chambers 10 pivoting about spindles 9, of general substantially semi-cylindrical shape, housed in the casing 2, whereof the outer face 10*a* of each of the latter is shaped in order to be able to be in contact with the wall 2*c* solely along a line 10*b* parallel to the axis 3*a*; support means 11 located between the chambers 10 and two radial arms 12 of the hub 3 each forming on one of their sides, a bearing 24 and on the other opposite side a knife 13 parallel to the axis 3*a* against which is pressed — by a compression spring 15 bearing against the bottom of a housing 16 provided in the non-cylindrical face of the chamber 10, opposite the corresponding spindle 9 — a bearing 14 fixed to a guide support 14*a* and a rod 14*b*. The parts 14*a* and 15 are shaped such that the bearing 14 is in a centered position when the regulator is inoperative and has a certain lateral clearance in the direction of the arrows 14*c* when operating. A hole 14*d* in the chamber 10 facilitates the passage of the rod 14*b* and its axial clearance. The free space in the casing 2 is filled at least partly with a liquid whose density is greater than that of the chambers 10, such as mercury.

When the casing 2, driven by the shaft 6, pivots in the direction of the arrow 5, the differential centrifugal force applied to the chambers 10 and to the liquid tends to introduce the latter into the space 17 between the wall 2*c* and the sides 10*a* by urging the chambers 10 towards the hub 3 by their pointed end parts 18 remote from the spindles 9. The springs 15 are compressed and the hub 3 pivots about the axis 3*a* in the direction of the arrows f, with respect to the casing 2. The relative angular position of the shafts 4 and 6 thus varies depending on the speed of the shaft 6.

The support means 11 comprise two symmetrical arrangements with respect to the axis 3*a*, each constituted by a rigid knife 19 having a double edge, supported by an elastically deformable member 20, such as a plate of elastomer fixed to the chamber 10 by means of a screw 21 and a clamping plate 22 pressing on a bearing 23 and the bearing 24 located in facing relationship. The member 20 retains the knife 19 in the case of opposite rotation of the shaft 4 at the beginning. The knife 19 may be inclined, which ensures the least friction and a certain lateral clearance of the chamber 10 with respect to the arm 12 on which it bears in a plane at right-angles to the axis 3*a* in order to give the regulator the sensitivity required for its correct operation and to eliminate any hysteresis. Each bearing 23 is fixed to a support 25, force-fitted in a blind hole in the chamber 10.

The sealing means comprise two membranes 26 each in the shape of a closed circular ring, whose cross sectional shape is that of an M, gripped at its two free end parts forming rings 26*a*, 26*b*, in two peripheral grooves located one opposite the other, 27*a*, 27*b* provided respectively in the sides 2*a*, 2*b* and the hub 3 at its two end parts, adjacent a bearing 28 placed between the casing 2 and the hub 3 such that the central part 26*c* of the membrane is able to absorb the relative and limited angular movements of the hub 3 with respect to the casing 2.

The coupling means 29 are connected mechanically directly to the spindles 9 and indirectly to the drive shaft by mechanical means 30 facilitating:

an adjustment of the relative angular position of the drive shaft with respect to the casing 2, through 360°.

a correct rotation of the casing despite non-coincidence of the axes of rotation of the drive shaft and of the hub 3.

The means 29 are symmetrical with respect to the axis 3*a* when the axes 3*a* and 6*a* of the drive shaft and of the hub 3 are in alignment. The description relates to this case.

Two first identical connecting rods 32 are each provided at one end with a hole 33, through which passes one of the journals 31 to which it is pivoted and at the other end forms a fork 34 provided with holes 35 in which is housed a first lug 36 provided with a hole 37 of a floating cross piece 38 pivotally connected to the two connecting rods 32 by connecting members 67 passing through the pairs of holes 35, 37. The rigid crosspiece 38 is in the shape of two T's, whose webs 39 are spaced apart one in the extension of the other; the bases 40 are connected by a hub 41 provided with a central recess 42; the heads 43 are opposite the curved bases 40; the transverse sides 44 are in the same plane separated from that of the hub 41 and each enlarged at each free end part to form the lug 36 and a lug 45 provided with a hole 46. Two pairs of second parallel connecting rods 47 are each provided at one end with holes 48, through which passes — as well as through the hole 46 — a member 68 for connection and pivotal connection to the crosspiece 38 and at the other end, with holes 49 through which passes a connecting member 69 also passing through the hole 50 in a lug 51 of a rocking lever 52, of general flat perpendicular shape and symmetrical to the plane of the spindles 9 comprising another diametrically opposed lug 51 and a central hub 53 of greater thickness than the lugs 51 having a central bore 54 and an enlarged part 55 with a radial slot 56, provided, on one side of the slot 56, with a tapped hole 57 and, on the other side of the slot 56, with a smooth hole 58, on the same axis 59 and of a slightly greater diameter. The region of the enlarged part 55 adjacent the opening of the hole 58 opposite the hole 57 constitutes a seat 60 for the head 61 of a screw 62 able to pass through the hole 58 and co-operate with the tapped hole 57.

The single rocking lever 52 is pivoted by the lugs 51 to the two pairs of connecting rods 47 pivoted to the single crosspiece 38 pivoted to the two connecting rods 32, respectively pivoted to the two spindles 9 symmetrically with respect to the axis 3*a*. The concavity of the crosspiece 38 is directed in the opposite direction to the casing 2, the hub 41 being in the vicinity of the side 2*b*, which makes it possible to house the hub 53 and thus considerably reduce the axial bulk of the regulator. In addition, the forces created by the driving torque are located in a single plane.

The means 30 comprise a hub 63 in the shape of a circular ring, housed in the bore 54, comprising a radial slot 64 which makes the latter elastically deformable and at least one — in particular several — "blind" slots 65 all opening into a central bore 66 receiving the drive shaft.

When the screw 62 is not tightened, the drive shaft is housed in the bore 66 with slight friction, the hub 63 is housed in the bore 54 with slight friction. The casing 2 may thus pivot through 360° with respect to the drive shaft which facilitates adjustment of their relative angular position. By screwing the screw 62, the rocking lever 52 is made rigidly integral with the hub 63 also made rigidly integral with the drive shaft. This arrangement is such that the regulator operates even if the axis of the drive shaft and the axis 3*a* are not in alignment. In addition, the connecting rods 32, 47 are all subject to tensile or compressive stress for a given direction of rotation.

What is claimed is:

1. A centrifugal regulator comprising a drive shaft, a driven shaft in at least approximate axial alignment with said drive shaft, a hub fixed on said driven shaft, an annular casing surrounding said hub, said casing having a peripheral wall and two end walls, sealing means providing a fluid-tight seal between said casing and said hub while permitting angular movement between said casing and said hub, two spindles provided in said casing parallel to and spaced from the axis of said hub, said spindles having end portions projecting from one end of said casing, two chambers inside said casing and pivotally mounted on said spindle, said hub having two projecting arms, spring means acting between said arms and said chambers to bias said chambers toward the peripheral wall of said casing, mercury sealed in said casing, said chambers having a density less than that of mercury, whereby upon rotation of said casing the mercury acts by centrifugal force to move said chambers radially inwardly against the bias of said spring means, double edge knife blades acting between v-shaped seats on said chambers and v-shaped seats on said arms of the hub to turn said hub angularly with respect to said casing when said chambers move inwardly, means flexibly supporting said knife blades between said seats, a collar on said drive shaft, a rocking lever rotatable on said collar, means for securing said rocking lever to said collar and drive shaft in adjusted angular position and means connecting said rocking lever with said projecting end portions of said spindles and thereby coupling said casing adjustably with said drive shaft.

2. A regulator according to claim 1, in which said means for supporting each of said knives comprises an elastic deformable member carrying said knife and fixed to the respective one of said chambers.

3. A regulator according to claim 1, in which each of said v-shaped seats on said chambers comprises a bearing portion having a v-groove to receive the respective knife edge and an integral stem portion extending into a hole in the respective chamber and fixed therein.

4. A regulator according to claim 1, in which each of said arms of the hub has a knife edge thereon, and in which said spring means comprises a bearing member having a v-groove to receive said knife edge of said arm and a stem portion freely received in a hole in the respective chamber, and a compression coil spring acting between said bearing member and said chamber.

5. A regulator according to claim 1, in which said rocking lever has a central hub portion having a bore to receive said collar, said central hub portion having a radial split and screw means for drawing portions of said central hub at opposite sides of said split together to constrict said central hub portion on said collar on said driveshaft.

6. A regulator according to claim 5, in which said collar has a radial split and at least one internal blind radial slot whereby said collar is contractible to grip said driveshaft when said central hub portion of said rocking lever is contracted.

7. A regulator according to claim 1, in which said means connecting said rocking lever with said spindles comprises a floating crosspiece surrounding said drive shaft adjacent said rocking lever, first linkage connecting said crosspiece with said rocking lever and second linkage connecting said crosspiece with said spindles.

8. A regulator according to claim 1, in which said sealing means comprises two annular membranes each of substantially M-shaped cross section and having free circular end parts forming rings received respectively in peripheral grooves located opposite each other in said casing and in said hub respectively and bearing rings placed between said hub and said casing adjacent said rings.

9. A centrifugal regulator comprising a drive shaft, a driven shaft in at least approximately axial alignment with said drive shaft, a hub fixed on said driven shaft, an annular casing surrounding said hub and having a peripheral wall and opposite end walls, sealing means providing a fluid-tight seal between said casing and said hub while permitting angular movement between them, two spindles supported in said casing parallel to the axis of said hub, two chambers pivoted on said spindles and of lower density than mercury, said hub having two arms, spring means acting between said arms of said hub and said chambers to bias said chambers toward said peripheral wall of said casing, mercury in said casing, said mercury being forced outwardly by centrifugal force upon rotation of the casing and thereby moving said chambers inwardly against the bias of said spring means, double edge knives acting between bearings on said chambers and bearings on said arms to turn said hub angularly relative to said casing upon inward movement of said chambers, and bearings on said arms to turn said hub angularly relative to said casing upon inward movement of said chambers, and means coupling said casing with said drive shaft to be driven rotationally by said driveshaft, said sealing means comprising two annular membranes each of substantially M-shaped cross-section and having circular end parts forming rings received respectively in peripheral grooves located opposite each other in said casing and in said hub respectively and bearing rings between said hub and said casing adjacent said rings.

* * * * *